US007733319B2

(12) United States Patent
Aiba

(10) Patent No.: US 7,733,319 B2
(45) Date of Patent: Jun. 8, 2010

(54) IMAGE DISPLAY UNIT

(75) Inventor: Hideki Aiba, Ibaraki-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 1044 days.

(21) Appl. No.: 11/442,215

(22) Filed: May 30, 2006

(65) Prior Publication Data

US 2006/0267904 A1 Nov. 30, 2006

(30) Foreign Application Priority Data

May 31, 2005 (JP) ............................. 2005-158801

(51) Int. Cl.
*G09G 3/36* (2006.01)
*H04N 7/01* (2006.01)

(52) U.S. Cl. ......................................... 345/98; 348/441

(58) Field of Classification Search ....................... None
See application file for complete search history.

(56) References Cited

U.S. PATENT DOCUMENTS 7,280,103 B2 * 10/2007 Taoka et al. ................. 345/204

OTHER PUBLICATIONS

Kurita, T., "Fundamental Deterioration of Picture Quality for Moving Images Displayed on LCDs and Methods for Improvement", *Technical Report of IEICE*, EID2000-47, pp. 13-18, (2000). Abstract.

* cited by examiner

*Primary Examiner*—Alexander Eisen
*Assistant Examiner*—Robin Mishler
(74) *Attorney, Agent, or Firm*—Jerald L. Meyer; Derek Richmond; Stanley N. Protigal

(57) ABSTRACT

A motion vector detection circuit detects a motion vector from a video signal and a one-frame delayed video signal. An interpolation video signal generation circuit uses this detected motion vector to generate an interpolation video signal which is interpolated between frames. Further, two time base emphasizing circuits respectively use a video signal of a preceding frame to perform time base emphasis with respect to the video signal and the generated interpolation video signal. The video signal and the interpolation video signal subjected to time base emphasis are written in a time-series conversion memory. Furthermore, alternately reading the interpolation video signal and the video signal in the mentioned order with a frequency which is double a write frequency can obtain an output video signal having a doubled frame frequency.

4 Claims, 16 Drawing Sheets

FIG. 14

| | | AFTER CHANGEOVER (fa) | | | | | | | | | | | | | | | | |
|---|---|---|---|---|---|---|---|---|---|---|---|---|---|---|---|---|---|---|
| | | 0 | 16 | 32 | 48 | 64 | 80 | 96 | 112 | 128 | 144 | 160 | 176 | 192 | 208 | 224 | 240 | 256 |
| BEFORE CHANGEOVER (fb) | 0 | | 30 | 36 | 59 | 70 | 74 | 70 | 76 | 69 | 50 | 51 | 38 | 26 | 23 | 19 | 5 | |
| | 16 | | | 50 | 79 | 76 | 69 | 83 | 83 | 75 | 60 | 54 | 38 | 30 | 22 | 17 | 6 | |
| | 32 | | 66 | | 57 | 80 | 84 | 79 | 72 | 71 | 72 | 68 | 61 | 44 | 38 | 25 | 5 | |
| | 48 | | 45 | 50 | | 99 | 66 | 85 | 74 | 76 | 68 | 50 | 34 | 17 | 23 | 20 | 3 | |
| | 64 | | 30 | 50 | 63 | | 69 | 77 | 71 | 64 | 62 | 44 | 46 | 19 | 21 | 25 | 5 | |
| | 80 | | 27 | 39 | 41 | 54 | | 108 | 82 | 76 | 64 | 50 | 45 | 27 | 26 | 21 | 4 | |
| | 96 | | 28 | 39 | 34 | 53 | 54 | | 113 | 82 | 75 | 53 | 39 | 26 | 22 | 17 | 7 | |
| | 112 | | 28 | 31 | 40 | 45 | 53 | 59 | | 55 | 55 | 35 | 29 | 30 | 19 | 21 | 4 | |
| | 128 | | 20 | 26 | 36 | 41 | 54 | 59 | 55 | | 76 | 44 | 41 | 36 | 25 | 17 | 6 | |
| | 144 | | 23 | 26 | 37 | 44 | 51 | 54 | 55 | 76 | | 48 | 48 | 35 | 26 | 25 | 7 | |
| | 160 | | 16 | 24 | 30 | 41 | 51 | 59 | 50 | 51 | 45 | | 49 | 45 | 22 | 20 | 8 | |
| | 178 | | 15 | 24 | 35 | 42 | 51 | 53 | 54 | 53 | 47 | 39 | | 39 | 19 | 17 | 10 | |
| | 192 | | 15 | 23 | 31 | 39 | 50 | 54 | 48 | 53 | 46 | 38 | 13 | | 44 | 32 | 15 | |
| | 208 | | 14 | 18 | 30 | 38 | 47 | 47 | 50 | 51 | 40 | 37 | 6 | 32 | | 49 | 18 | |
| | 224 | | 12 | 23 | 27 | 40 | 45 | 45 | 48 | 53 | 35 | 27 | 3 | 16 | 44 | | 40 | |
| | 240 | | 10 | 19 | 27 | 39 | 48 | 48 | 44 | 51 | 27 | 23 | 2 | 13 | 35 | 8 | | |
| | 256 | | 8 | 20 | 28 | 36 | 48 | 46 | 43 | 43 | 31 | 29 | 1 | 11 | 23 | 5 | 19 | |

IMAGE DISPLAY UNIT

BACKGROUND OF THE INVENTION

1. Field of the Invention

The present invention relates to a hold type image display unit as typified by a liquid crystal display unit, and more particularly, it relates to an image display unit which can reduce blurriness of a moving image.

2. Description of the Related Art

As an image display units, there are an impulse type display unit which intensively emits light in a moment that an image is written like a display unit using a cathode ray tube (CRT) and a hold type display unit which holds display from writing of an image to writing of an image of a next frame like an active matrix type display unit having a memory function per each pixel. As the active matrix type display unit, there is a liquid crystal display unit using a thin film transistor (TFT). In the liquid crystal display unit, an image written in a pixel by a TFT and a capacitor arranged in accordance with each pixel is held for a fixed time.

Since a response speed of the liquid crystal display unit is slow, the liquid crystal display unit has a problem that an after-image is generated when a moving image is displayed. As one of methods reducing this problem, there is a method using a filter which emphasizes a video signal in a time base direction (a time base emphasizing circuit).

A hold type display unit such as the liquid crystal display unit, however, cannot solve blurriness (which will be referred to as a moving image blur) of a moving image caused by an influence of a visual system integration owing to hold display itself even if a response speed of the liquid crystal is increased.

This problem and its countermeasure are described in "Fundamental Deterioration of Picture Quality for Moving Images Displayed on LCDs and Method for Improvement" by Taiichiro Kurita, Technical Report of IEICE EID2000-47 (2000-09), p. 13-18. It is to be noted that the moving image blur is generated in not only the liquid crystal display unit but also an organic electroluminescence display unit if this unit is of an active matrix type. The above-described reference describes a first method which shortens a hold time to approximate to display of the impulse type and a second method which doubles a 60-Hz frame frequency of an input video signal to 120 Hz by motion compensating means as countermeasures for the moving image blur.

The first method has a problem that means for shuts a backlight in synchronization with a video signal is required and display without flickering which is an advantage of the hold type display is deteriorated (a first problem). The second method has a problem that a sampling frequency of a video signal and a writing speed of a liquid must be respectively doubled and this operation imposes a great burden on a circuit scale or an operating speed of a circuit, thus involving a practical difficulty (a second problem).

SUMMARY OF THE INVENTION

In view of the above-described problems, it is an object of the present invention to provide an image display unit which can reduce a moving image blur without deteriorating advantages of hold type display which can perform display without flickering. Further, it is another object of the present invention to provide an image display unit which can be readily realized with a reduced burden on an operating speed of a circuit or a circuit scale when decreasing a moving image blur.

To achieve these objects, according to an aspect of the present invention, there is provided an image display unit using an active matrix type display panel which has a plurality of pixels arranged in a matrix form and holds an electrical signal pixel by pixel for a predetermined time to perform display, the image display unit comprising: a delaying section which delays a first video signal input in a first frame cycle by one frame to generate a second video signal; an interpolation video signal generating section which uses the first video signal and the second video signal to generate an interpolation video signal which is interpolated in a temporally advanced section of sections obtained by dividing a period of each first frame cycle into two; a first time base emphasizing section which uses the second video signal to emphasize a high-pass component of the interpolation video signal in a time base direction; a second time base emphasizing section which uses the interpolation video signal to emphasize a high-pass component of the first video signal in the time base direction; a write section which simultaneously writes in a memory the interpolation video signal output from the first time emphasizing section and the first video signal output from the second time emphasizing section in the first frame cycle; and a read section which sequentially reads the interpolation video signal and the first video signal written in the memory by the write section in a second frame cycle obtained by multiplying the first frame cycle by ½ in the order of the interpolation video signal and the first video signal.

In a preferred embodiment of the present invention, the first time base emphasizing section uses the second video signal and the first video signal to emphasize the high-pass component of the interpolation video signal in the time base direction.

In a preferred embodiment of the present invention, the second time base emphasizing section uses the interpolation video signal and the second video signal to emphasize the high-pass component of the first video signal in the time base direction.

Furthermore, to achieve the above-described objects, according to another aspect of the present invention, there is provided an image display unit using an active matrix type display panel which has a plurality of pixels arranged in a matrix form and holds an electrical signal pixel by pixel for a predetermined time to perform display, the image display unit comprising: a delaying section which delays a first video signal input in a first frame cycle by one frame to generate a second video signal; first to (n−1)th interpolation video signal generating sections which use the first video signal and the second video signal to generate first to (n−1)th interpolation video signals (n is a predetermined integer which is not smaller than 3) which are respectively interpolated in temporally advanced first to (n−1)th sections of sections obtained by dividing a period of each first frame cycle into n; a first time base emphasizing section which uses the second video signal to emphasize a high-pass component of the first interpolation video signal in a time base direction; second to (n−1)th time base emphasizing section which respectively emphasize high-pass components of the second to (n−1)th interpolation video signals in the time base direction; an nth time base emphasizing section which uses the (n−1)th interpolation video signal to emphasize a high-pass component of the first video signal in the time base direction; a write section which simultaneously writes in a memory in the first frame cycle the first to (n−1)th interpolation video signals having the high-pass components emphasized in the time base direction and the first video signal having the high-pass component emphasized in the time base direction; and a read section which reads the first to (n−1)th interpolation video signals and the first video signal written by the write section in a second frame cycle obtained by multiplying the first frame cycle by 1/n in the order of the first interpolation video signal, the second interpolation video signal, . . . , the (n−1)th interpolation video signal, and the first video signal, wherein an ith time base emphasizing section (i is an integer which is not smaller than 2 and not greater than n−1) in the second to (n−1)th time base emphasizing section uses an (i−1)th interpolation video signal to emphasize an ith interpolation video signal.

According to the present invention, a moving image blur can be reduced without deteriorating advantages of the hold type display which can perform display without flickering.

Further, according to the present invention, the interpolation video signal which is generated to increase a frame frequency and the base video signal are subjected to time base emphasis processing by utilizing a correlation between preceding and following video signals before actually increasing the frame frequency. Therefore, a circuit can be readily realized without a need of increasing an operating speed of the time base emphasizing circuit.

Further, since the number of frame memories can be reduced and a special circuit such as one which shuts a backlight is not required, an increase in cost can be suppressed.

The nature, principle and utility of the invention will become more apparent from the following detailed description when read in conjunction with the accompanying drawings.

BRIEF DESCRIPTION OF THE DRAWINGS

In the accompanying drawings:

FIG. 14 shows an example of a conversion table used in the fifth embodiment according to the present invention;

DESCRIPTION OF THE PREFERRED EMBODIMENTS

An image display unit according to the present invention will now be described hereinafter with reference to the accompanying drawings.

First Embodiment

[Entire Structure]

Figure 1:
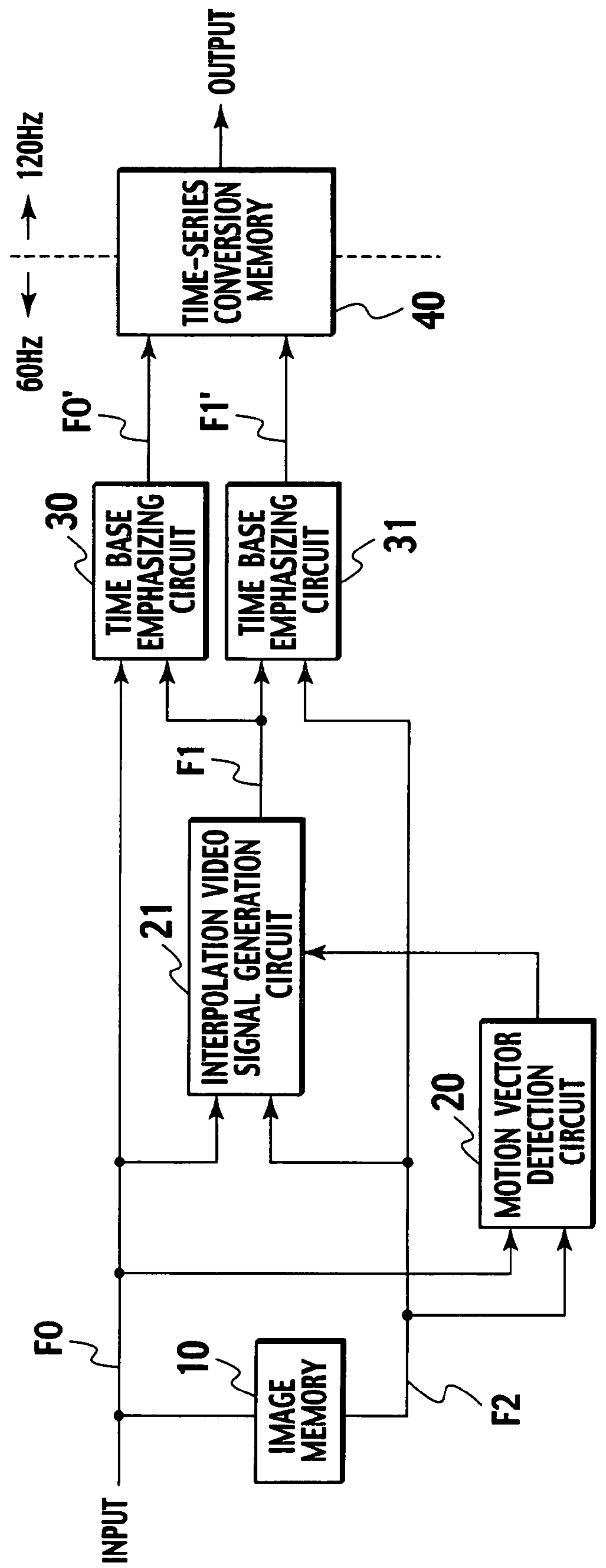
FIG. 1 is a block diagram showing a first embodiment of an image display unit according to the present invention.

FIG. 1 is a block diagram showing a first embodiment of an image display unit according to the present invention.

In FIG. 1, an input video signal F0 is supplied to an image memory 10, and this image memory 10 generates a one-frame delayed video signal F2. This input video signal F0 and the one-frame delayed video signal F2 are respectively supplied to a motion vector detection circuit 20 and an interpolation video signal generation circuit 21.

The motion vector detection circuit 20 detects a motion vector between frames based on the input video signal F0 and the one-frame delayed video signal F2 supplied thereto by using, e.g., a matching method, and supplies a detected vector to the interpolation video signal generation circuit 21.

The interpolation video signal generation circuit 21 generates an interpolation video signal F1 from the input video signal F0 and the one-frame delayed video signal F2 based on the motion vector supplied thereto. Further, the input video signal F0 and the interpolation video signal F1 are supplied to a time base emphasizing circuit 30, and the interpolation video signal F1 and the one-frame delayed video signal F2 are supplied to a time base emphasizing circuit 31.

The time base emphasizing circuit 30 uses the input video signal F0 and the interpolation video signal F1 supplied thereto to generate an emphasized video signal F0' subjected to time base emphasis and supplies the generated signal to a time-series conversion memory 40.

The time base emphasizing circuit 31 uses the interpolation video signal F1 and the one-frame delayed video signal F2 supplied thereto to generate an emphasized video signal F1' subjected to time base emphasis and supplies the generated signal to the time-series memory 40.

The time-series memory 40 temporarily stores the emphasized video signals F0' and F1' supplied thereto, and outputs the emphasized video signals F1' and F0' in the mentioned order with a frame frequency which is double a frame frequency at the time of input.

Incidentally, it is assumed that the input video signal F0 is a sequential scanning signal having a frame frequency of 60 Hz and an interlace type NTSC signal or HDTV signal has been converted into a sequential scanning signal on a previous stage for the convenience's sake.

Particulars of each main block will now be described hereinafter.

[Interpolation Video Signal Generation Circuit]

The interpolation video signal generation circuit 21 generates the interpolation video signal F1 from the input video signal F0 and the one-frame delayed video signal F2 supplied thereto. The interpolation video signal F1 is a video signal which should be inserted between frames in a frame frequency before conversion when no video signal essentially exists in case of using the time-series conversion memory 40 on the rear stage to double the frame frequency. This interpolation video signal F1 is generated from the input video signal F0 and the one-frame delayed video signal F2 by effecting motion compensation interpolation based on a motion vector which is detected by the motion vector detection circuit 20 using, e.g., a matching method.

Motion compensation interpolation processing will now be described in detail hereinafter with reference to FIG. 11.

Figure 11:
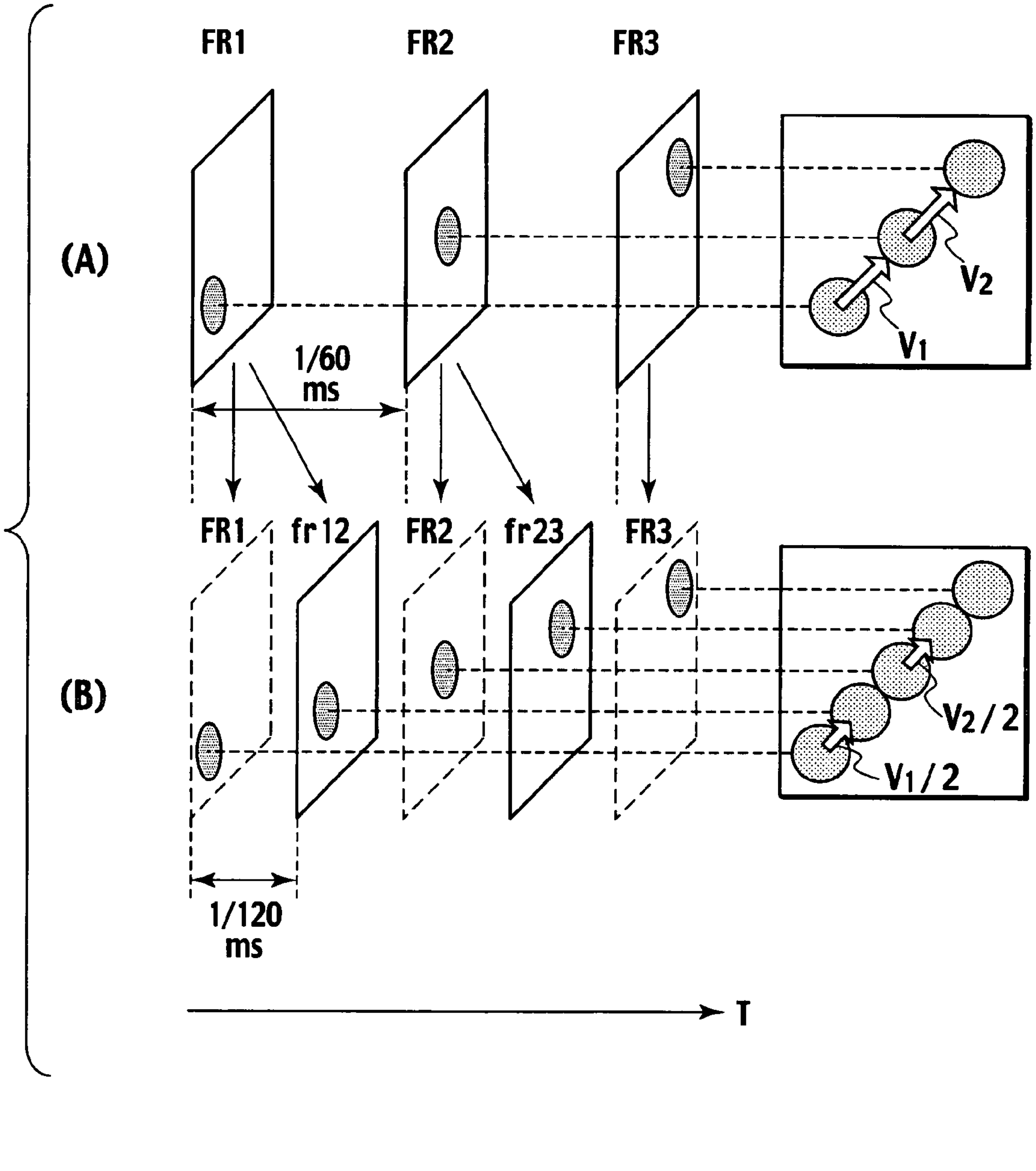
FIG. 11 is a view illustrating motion compensation interpolation processing.

The motion compensation interpolation in the interpolation video signal generation circuit 21 moves vectors as shown in FIG. 11 when a conversion ratio of a frame frequency is twofold. (A) in FIG. 11 shows the input video signal F0 which is supplied to the interpolation video signal generation circuit 21, and (B) in FIG. 11 shows the interpolation video signal F1 which is generated in the interpolation video signal generation circuit 21. It is assumed that FR1, FR2, FR3 . . . denote frame numbers of the input video signal F0, and fr12, fr23 . . . designate frame numbers of the interpolation video signal F1. It is to be noted that, in (B) of FIG. 11, the frames FR1 to FR3 in (A) of FIG. 11 are indicated by dotted lines at positions where these frames exist on a time base of ((B) of FIG. 11) for better understanding. The frame fr12 is subjected to vectorial transfer to be inserted between the frames FR1 and FR2, and the frame fr23 is subjected to vectorial transfer to be inserted between the frames FR2 and FR3.

The right-hand side of (A) and (B) of FIG. 11 shows how an object O moves based on the frames fr12 to fr23. In (A) of FIG. 11, the object O moves based on a motion vector $V_1$ from a position in the frame FR1 to a position in the frame FR2, and moves based on a motion vector $V_2$ from the position in the frame FR2 a position in the frame FR3. Positions of the object O in the frames FR1 to FR3 in (B) of FIG. 11 are respectively the same as positions of the object O in the frames FR1 to FR3 in (A) of FIG. 11. Here, in order to generate an image of the frame fr12, moving an image of the frame FR1 by $V_1/2$ can suffice. In order to generate an image of the frame fr23, moving an image of the frame FR2 by $V_2/2$ can suffice.

In the example shown in FIG. 11, image data of the frame FR1 alone is used when generating the frame fr12, and image data of the frame FR2 alone is used when generating the frame fr23, but preceding and following frames may be also used. Image data of the frames FR1 and FR3 may be combined. In this case, the frame fr12 can be acquired by obtaining FR1' resulting from moving an image of the frame FR1 by $V_1/2$ and FR2' resulting from moving an image of the frame FR2 by $-V_1/2$, and mixing FR1' and FR2' at a rate of 1:1. Furthermore, the frame fr23 can be acquired by obtaining FR2" resulting from moving an image of the frame FR2 by $V_2/2$ and FR3' resulting from moving an image of the frame FR3 by $-V_2/2$, and mixing FR2" and F3 at a rate of 1:1. The mixing ratio described herein is just an example, and the present invention is not restricted thereto.

As described above, performing interpolation using not only one frame but also a plurality of frames when generating a frame of an output video signal can demonstrate an effect of reducing noise.

[Time Base Emphasizing Circuit]

Figure 2:
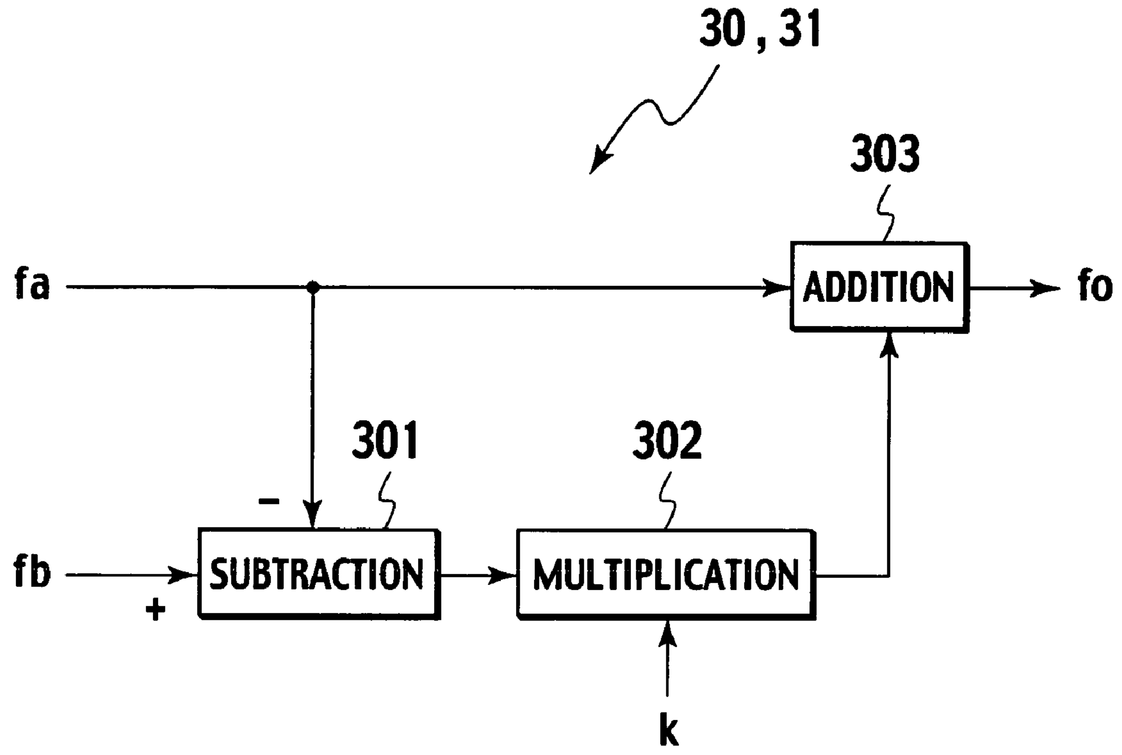
FIG. 2 is a block diagram showing a structural example of a time base emphasizing circuit in the embodiment.

Each of the time base emphasizing circuits 30 and 31 is a filter which emphasizes a video signal in a time base direction. FIG. 2 shows a structural example. Assuming that fa and fb are two types of input video signals, this time base emphasizing circuit is a circuit which obtains an output signal fo represented by the following Expression (1):

$$fo=fa+k(fa-fb) \quad (1)$$

Here, k is a gain coefficient which determines a degree of emphasizing a video signal, and it is set in accordance with response characteristics of a liquid crystal. k is set to a small value when response is relatively fast and there are few after-images, and k is set to a large value when response is slow and there are many after-images.

Assuming that an input video signal having a frame frequency of 60 Hz is converted into a signal having a doubled frequency, i.e., 120 Hz by the time-series conversion memory 40 shown in FIG. 1, a relationship between the input video signals fa and fb is that fb is an image which is one frame (1/120 s) ahead of fa.

Giving a more specific description, fa is the input video signal F0 and fb is the interpolation video signal F1 in the time base emphasizing circuit 30. Moreover, fa is the interpolation video signal F1 and fb is the one-frame delayed video signal F2 in the time base emphasizing circuit 31.

On the stage until the signals are supplied to the time-series conversion memory 40 shown in FIG. 1, the frame frequency is maintained at 60 Hz, but there are obtained the temporally continuous three frames (F2, F1 and F0) when the stage where the frame frequency is converted into the final frame frequency of 120 Hz is assumed. Therefore, providing the two time base emphasizing circuits like this embodiment can simultaneously obtain images corresponding to two frames, i.e., the input image F0' subjected to time base emphasis and the interpolation image F1' subjected to time base emphasis with respect to the input image of one frame on the stage where the frame frequency is 60 Hz.

Figure 12A:
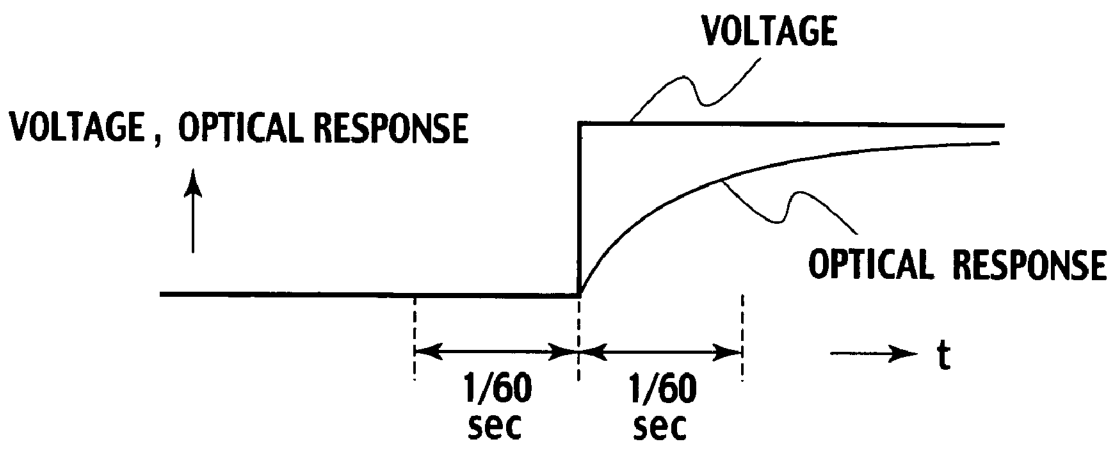
FIGS. 12A and 12B are views illustrating operations of time base emphasis processing.
Figure 12B:
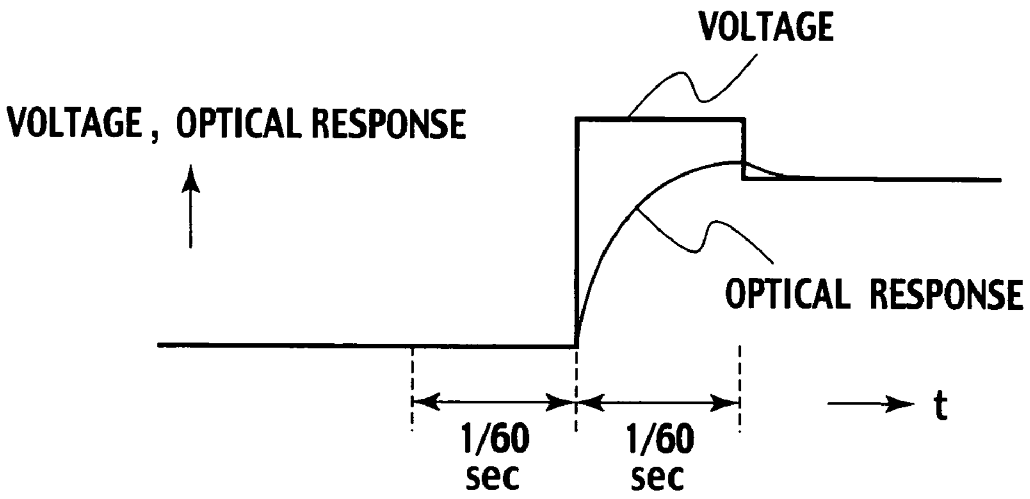

FIGS. 12A and 12B are views illustrating effects obtained by these time base emphasizing circuits 30 and 31. These figures show a voltage of a video signal which is used to change a liquid crystal screen from black to white and a degree of optical response with respect to this voltage of the video signal. In both FIGS. 12A and 12B, a horizontal axis represents a lapsed time and a vertical axis represents a voltage of a video signal and how optical response of the liquid crystal screen which emits light with this voltage varies. FIG. 12A shows an example where the time base emphasizing circuit is not used, and FIG. 12B shows an example where the time base emphasizing circuit according to the present embodiment is used.

In case of FIG. 12A, even if a voltage of a video signal is increased step by step in order to change a screen to be displayed from black to white, the optical response just gently changes since a response speed of a liquid crystal is slow. Therefore, an after-image is apt to be generated.

When the time base emphasizing circuit is used, a voltage which is higher than that in a prior art is output in a frame immediately after the voltage of the video signal used to change the screen from black to white varies as shown in FIG. 12B. Therefore, the optical response can be precipitously changed as shown in the drawing as compared with the example of FIG. 12A. Therefore, occurrence of an after-image can be suppressed.

[Time-Series Conversion Memory]

The emphasized video signals F0' and F1' generated by the two time base emphasizing circuits 30 and 31 are temporarily written in the time-series conversion memory 40. Moreover, these signals are alternately read with a frequency which is double a write frequency in the order of F1' and F0'. As a result, a frame frequency of the video signal output from the time-series conversion memory doubles 40 a frame frequency at the time of input.

Figure 13A:
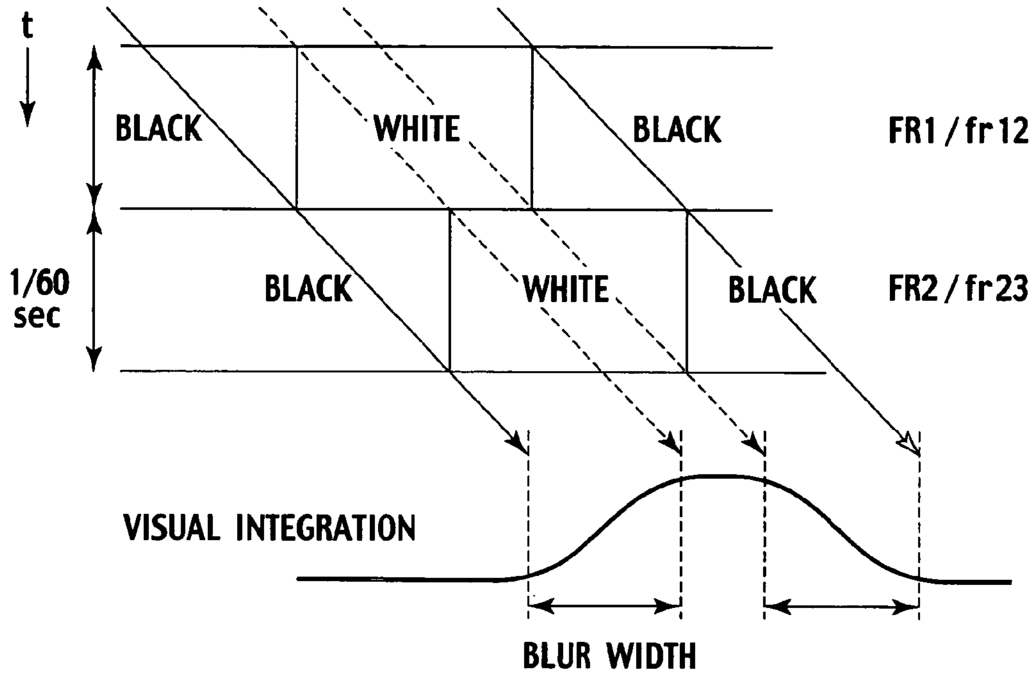
FIGS. 13A and 13B are views illustrating a moving image blur generated in hold type display.
Figure 13B:
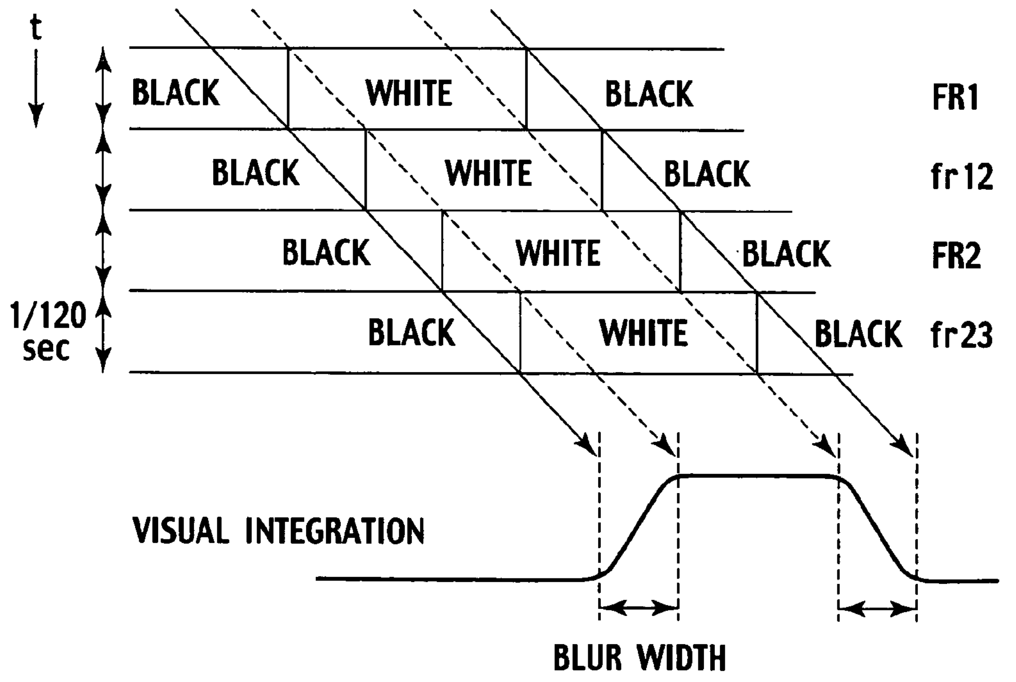

FIGS. 13A and 13B are views illustrating effects obtained by doubling the frame frequency by using this time-series conversion memory. A rectangular waveform in which black, white and black are aligned shows a display state of a frame image in case of parallel displacement in a horizontal direction. FIG. 13A shows an example where a frame frequency is 60 Hz, and FIG. 13B shows an example where a frame frequency is 120 Hz. Additionally, frame images each having a rectangular waveform of black, white and black moving in parallel along the horizontal direction are vertically aligned and displayed in a direction of a time t.

When a given frame shifts to the next frame and the rectangular waveform of black, white and black moves in parallel along the horizontal direction, there occurs a visual integration phenomenon that an image is integrated and seen in human eyes at a part where white shifts to black and black shifts to white. Therefore, as shown in each of FIGS. 13A and 13B, it seems that black smoothly shifts to white and white smoothly shifts to black. Thus, a moving image blur having a width shown in each of FIGS. 13A and 13B is generated. As apparent from FIGS. 13A and 13B, a width of a moving image blur is reduced as a frame frequency is increased.

It is to be noted that effects obtained by the above-described time base emphasizing circuit are eliminated in the description about FIGS. 13A and 13B in order to facilitate understanding effects obtained by doubling the frame frequency. The effects of this embodiment are actually a synergy of the effects obtained by doubling this frame frequency and the effects provided by the time base emphasizing circuit.

In regard to frame image outputs when this frame frequency is doubled, the emphasized video signal F0' obtained by subjecting the input video signal F00 to time base emphasis with the base frame frequency and the emphasized video signal F1' obtained by subjecting the interpolation video signal F1 generated in the interpolation video signal generation circuit to time base emphasis are alternately output.

Figure 3:
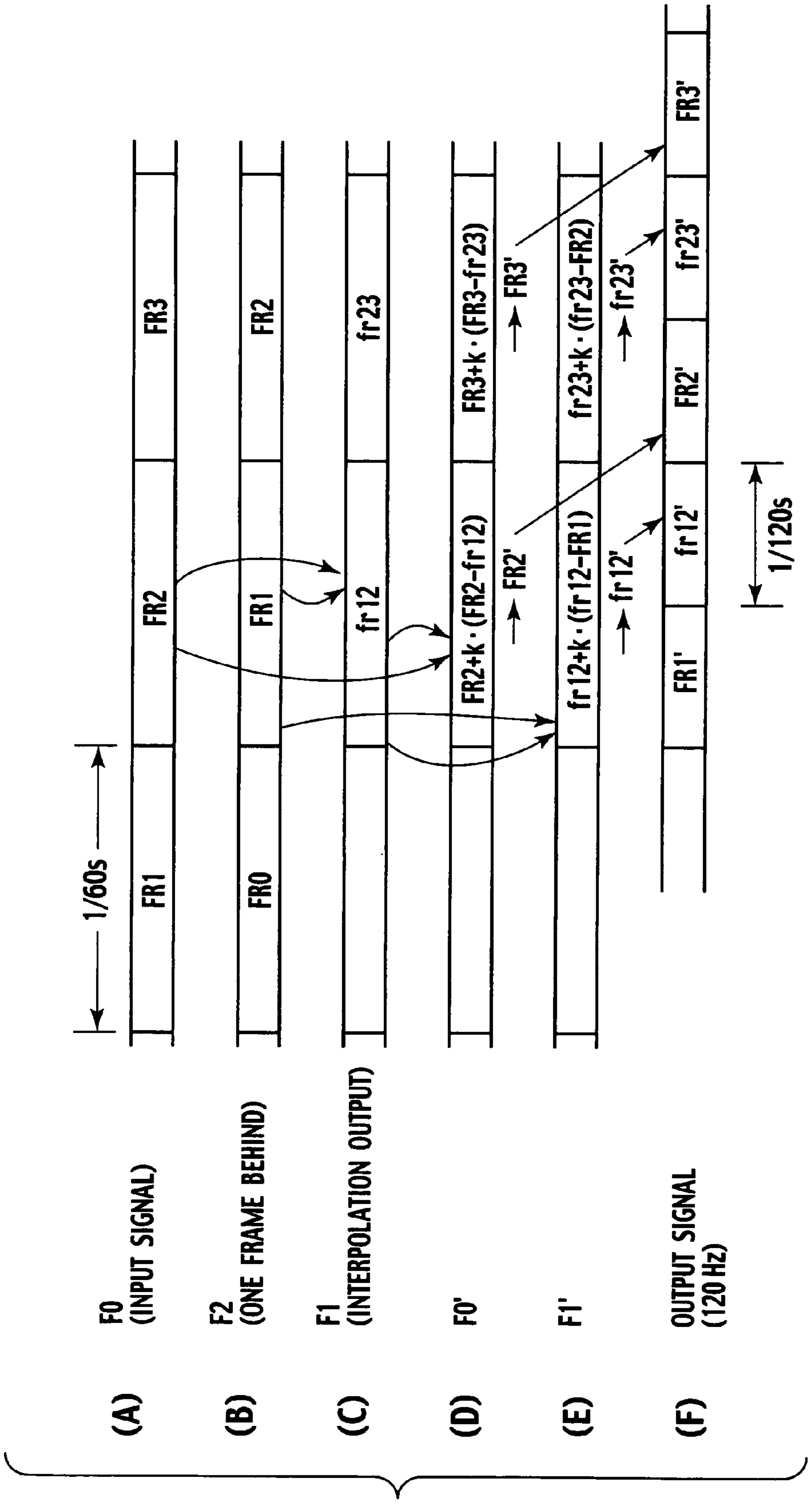
FIG. 3 is a timing chart illustrating an operation of the embodiment.

FIG. 3 shows a timing chart in the above-described series of processing.

(A) shows image data of the input video signal having a frame frequency of 60 Hz, and (B) shows image data of the video signal which is one frame delayed with respect to (A). Further, (C) shows image data of the interpolation video signal which is interpolated between (A) and (B). For example, a frame fr12 of (C) is generated from a frame FR2 of (A) and a frame FR1 of (B). This frame fr12 is a frame which should be interpolated between the frame FR2 and the frame FR1. (D) shows image data of the emphasized video signal obtained by performing time base emphasis with respect to the image data of (A). For example, a frame FR2' is a frame obtained by performing time base emphasis using fr12 of (C) based on FR2 of (A). Furthermore, (E) shows image data of the emphasized video signal obtained by performing time base emphasis with respect to the image data of (C). For example, a frame fr12' is a frame obtained by performing time base emphasis using FR1 of (B) based on fr12 of (C). Moreover, the respective image data subjected to time base emphasis in (D) and (E) are temporarily stored in the time-series conversion memory, their frame frequency rates are doubled, and these image data are output in the order shown in (F). For example, FR2' and fr12' are simultaneously generated, but they are output in the order of fr12' and FR2'.

As described above, in this embodiment, time base emphasis processing is executed with respect to the interpolation video signal generated to double a frame frequency and the base video signal before doubling the frame frequency. Therefore, as compared with an example where the time base emphasizing circuit is used after a frame frequency is doubled, there is an effect of avoiding a difficulty in realization of a circuit operation due to an increase in an operating speed of the time base emphasis circuit while providing an equivalent moving image blur prevention effect. Moreover, since the frame memory which is used by the interpolation video signal generation circuit can be also utilized as the frame memory for the time base emphasis processing, there can be obtained an effect of reducing the frame memories.

Second Embodiment

Figure 5:
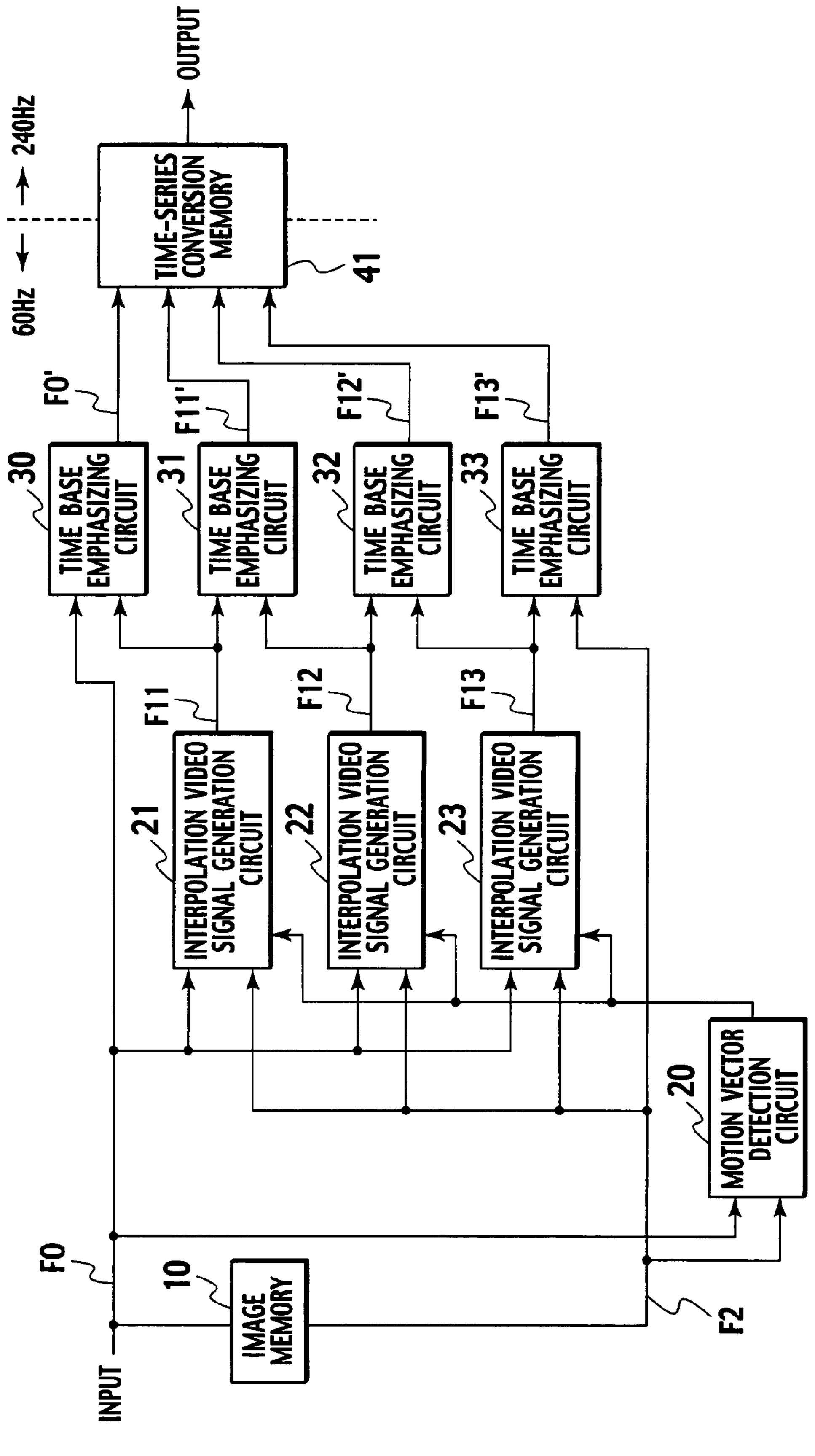
FIG. 5 is a block diagram showing a second embodiment.

FIG. 5 shows a second embodiment. A difference from the first embodiment lies in that a frame frequency of a video signal output is quadrupled. In order to quadruple a frame frequency, interpolation video signals F11, F12 and F13 corresponding to three frames to be inserted between frames are generated from an input video signal F0 and a one-frame delayed video signal F2 to be supplied. In this case, a motion vector from a motion vector detection circuit 20 is common, and three interpolation video signal generation circuits 21, 22 and 23 for F11, F12 and F13 are provided.

Additionally, four time base emphasizing circuits 30, 31, 32 and 33 are provided. The time base emphasizing circuit 30 generates a time base emphasized signal F0' from F0 and F11, the time base emphasizing circuit 31 generates a time base emphasized signal F11' from F11 and F12, the time base emphasizing circuit 32 generates the time base emphasizing signal F12' from F12 and F13, and the time base emphasizing circuit 33 generates a time base emphasizing signal F13' from F13 and F2. These images F0', F11', F12' and F13' corresponding to four frames are input to a time-series conversion memory 41 where time-series conversion is performed in such a manner that a video signal having a quadrupled frame frequency of 240 Hz can be obtained.

As described above, in this embodiment, before quadrupling a frame frequency, time base emphasis processing is carried out with respect to the interpolation video signal generated to quadruple the frame frequency and the base video signal. Therefore, as compared with an example where the time base emphasizing circuit is used after a frame frequency is quadrupled, there is an effect of avoiding a difficulty in realization of a circuit operation due to an increase in an operating speed of the time base emphasizing circuit while providing an equivalent moving image blur prevention effect. Further, since the frame memory used by the interpolation video signal generation circuit can be also utilized as the frame memory for the time base emphasis processing, there can be obtained an effect of reducing the frame memories.

It is to be noted that the above has described the example where the number of time base emphasizing circuits is four and the number of the interpolation vide signal generation circuits is three, but the present invention is not restricted thereto, and any structure can be realized as long as these circuits has a relationship that the number of the time base emphasizing circuit is n (n is an integer which is not smaller than 2) and the number of the interpolation video signal generation circuits is n−1.

Third Embodiment

Figure 6:
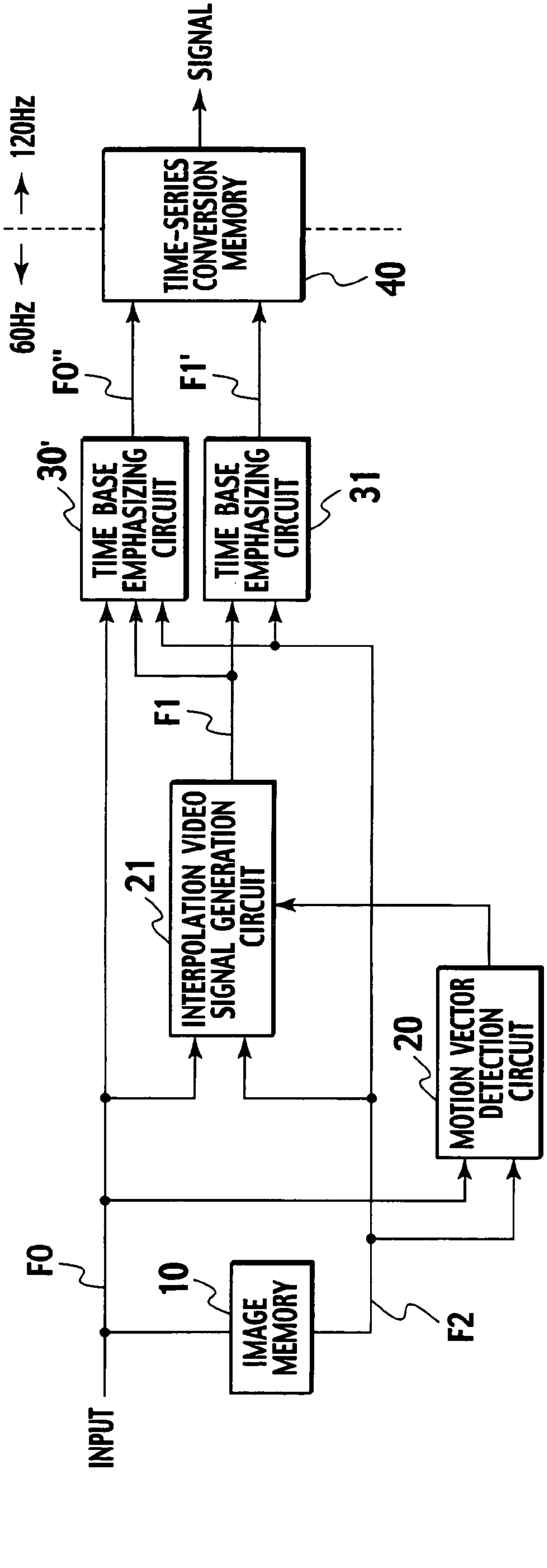
FIG. 6 is a block diagram showing a third embodiment.

FIG. 6 shows a third embodiment. A difference from the first embodiment lies in that the time base emphasizing circuit 30 depicted in FIG. 1 is substituted by a time base emphasizing circuit 30' to which not only an input video signal F0 and an interpolation video signal F1 but also a one-frame delayed video signal F2 are supplied as signals which are input to the time base emphasizing circuit.

[Time Base Emphasizing Circuit]

Figure 10:
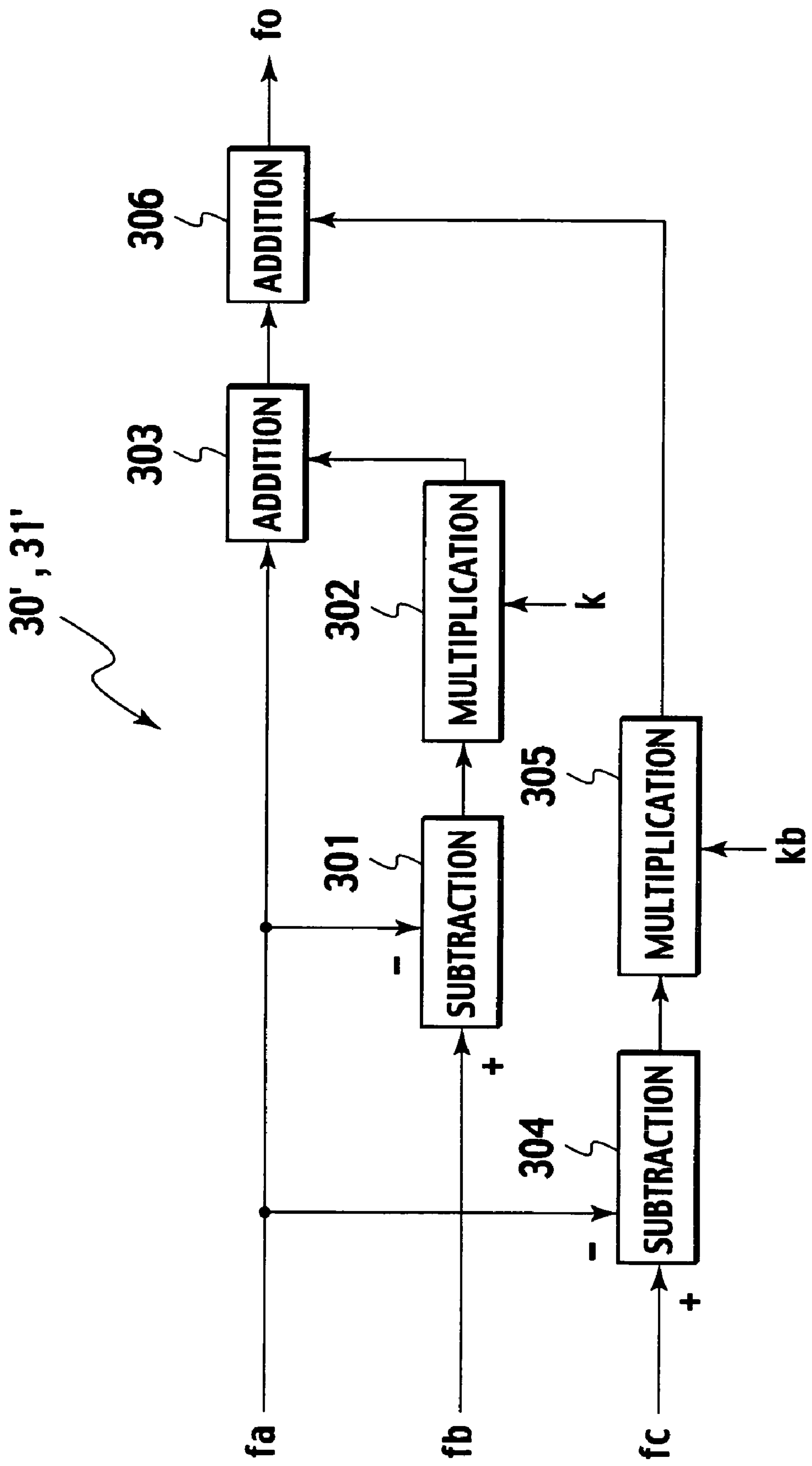
FIG. 10 is a block diagram showing a structural example of the time base emphasizing circuit in the embodiment.

FIG. 10 shows a structural example of this time base emphasizing circuit 30'. Determining three types of video signals which are input to the time base emphasizing circuit as fa, fb and fc, this structure obtains an output signal fo represented by the following Expression (2).

$$fo=fa+k(fa-fb)+kb(fa-fc) \quad (2)$$

In this expression, k and kb are gain coefficients each of which determines a degree of emphasizing a video signal and is set in accordance with response characteristics of a liquid crystal. k and kb are set to small values when response is relatively fast and there are few after-images, and k and ka are set to large values when response is slow and there are many after-images.

In regard to a relationship between video signals fa, fb and fc to be input, assuming that an input video signal having a frame frequency of 60 Hz is converted into a signal having a doubled frame frequency of 120 Hz by a time-series conversion memory 40 depicted in FIG. 6, fb is an image which is one frame (1/120 s) ahead of fa, and fc is an image which is two frames (1/120 s) ahead of fa.

Giving a more specific description, fa is an input video signal F0, fb is an interpolation video signal F1, and fc is a video signal F2 which is one frame delayed with a frame frequency of 60 Hz.

As described above, images which are respectively one frame ahead and two frames ahead of the input video signal F0 in conversion to the frame frequency 120 Hz are obtained as the interpolation video signal F1 and the video signal F2 which is one frame delayed with the frame frequency of 60 Hz, and hence the time base emphasizing circuit 30' shown in FIG. 6 can substitute for the time base emphasizing circuit 30 depicted in FIG. 1 without adding a dedicated frame memory.

Figure 7A:
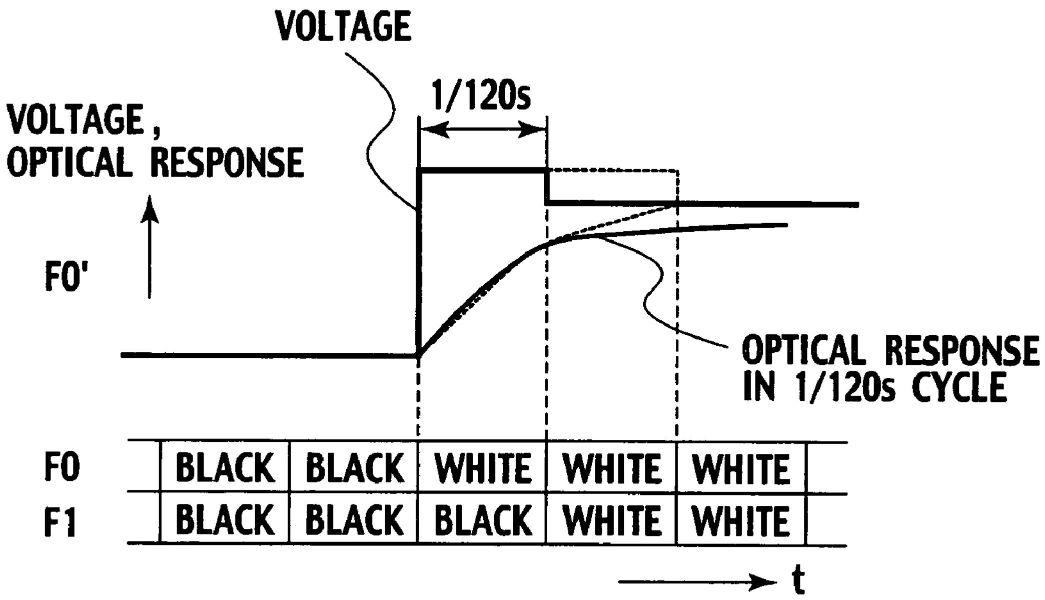
FIGS. 7A and 7B are views illustrating effects of the third embodiment.
Figure 7B:
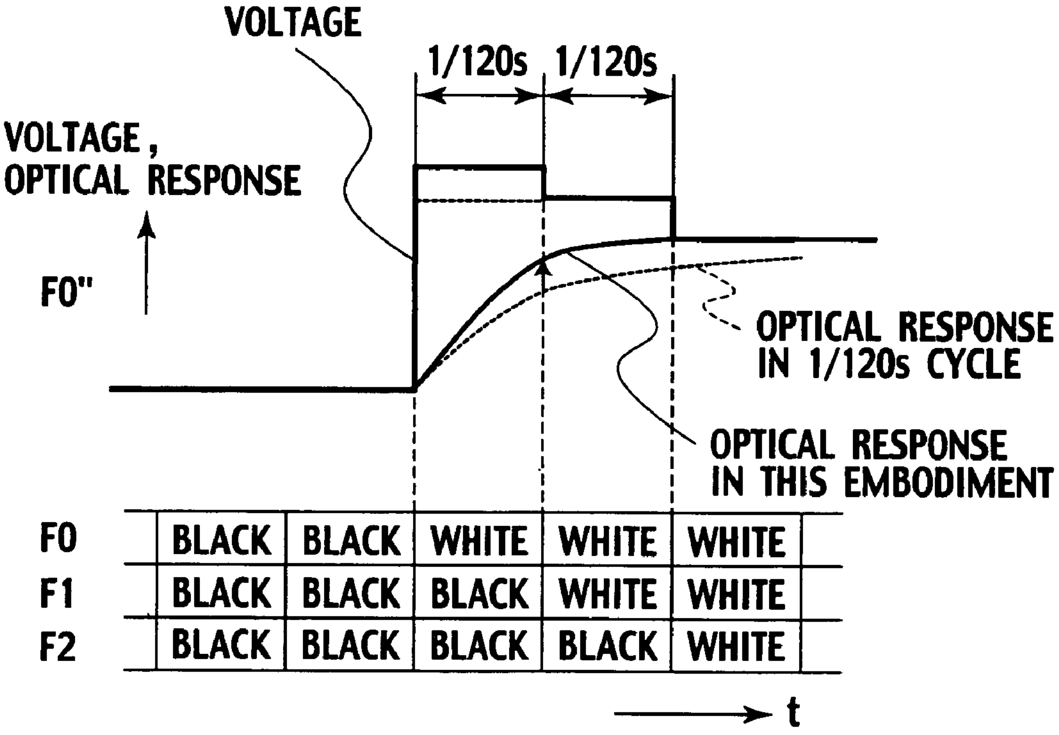

FIGS. 7A and 7B are views illustrating effects obtained by this time base emphasizing circuit 30'. In both FIGS. 7A and 7B, a horizontal axis represents a lapsed time, and a vertical axis represents a voltage of an emphasized video signal and how optical response of a liquid crystal screen which emits light with this voltage changes. Furthermore, a lower zone shows how video signals used to generate this emphasized video signal vary (from black to white).

FIG. 7A shows a state in the first embodiment, and FIG. 7B shows a state in this third embodiment.

As indicated by dotted lines in FIG. 7A, it is assumed that expected optical response correction is carried out when a frame frequency is 60 Hz. However, executing time base emphasis when a frame frequency is 120 Hz like the first embodiment indicated by solid lines reduces a period of providing an emphasized video signal to a ½ in an example where a frame frequency is 60 Hz, and hence sufficient correction is not performed as indicated by solid lines as optical response in some cases.

In this embodiment, as shown in FIG. 7B, the video signal F2 which is one frame delayed in conversion to the frame frequency 60 Hz is added to signals shown in FIG. 7A as a signal used to generate an emphasized video signal F0". Adopting such a configuration can obtain such an emphasized video signal F0" as depicted in FIG. 7B. As a result, optical response which cannot be sufficiently corrected in FIG. 7A can be formed as a precipitous curve as shown in FIG. 7B, thus enabling sufficient correction.

On the other hand, since a signal which is two frames ahead in conversion to 120 Hz does not exist with respect to the time base emphasizing circuit 31 in this state in order to realize this embodiment, there can be considered means for delaying the interpolation video signal F1 by one frame in conversion to 60 Hz by using a frame memory in units of 60 Hz, thereby obtaining a signal F3. However, it has been revealed from an experiment that a sufficient effect can be obtained by an increasing a degree of time base emphasis between two frame (F0 and F2) in conversion to 120 Hz using the time base emphasizing circuit 30' without utilizing such means even if the time base emphasizing circuit 31 does not perform time base emphasis between two frames (F1 and F3) in conversion to 120 Hz. That is because an integration time of a human visual perception is approximately 1/60 s, and hence correction with respect to the input video signal F0 and correction with respect to the interpolation video signal F1 are averaged.

As described above, in the third embodiment, when time base emphasis is performed with respect to the input video signal F0, time base emphasis can be executed between two frames in conversion to 120 Hz. Furthermore, since this time base emphasis is carried out between two frames, a new frame memory does not have to be added.

Therefore, there are characteristics of suppressing an increase in cost while improving the moving image blur prevention effect as compared with the prior art. Moreover, since the processing is executed in a state where an operating frequency is 60 Hz, it is possible to avoid a difficulty in realization of a circuit operation due to an increase in the operating frequency.

Fourth Embodiment

Figure 8:
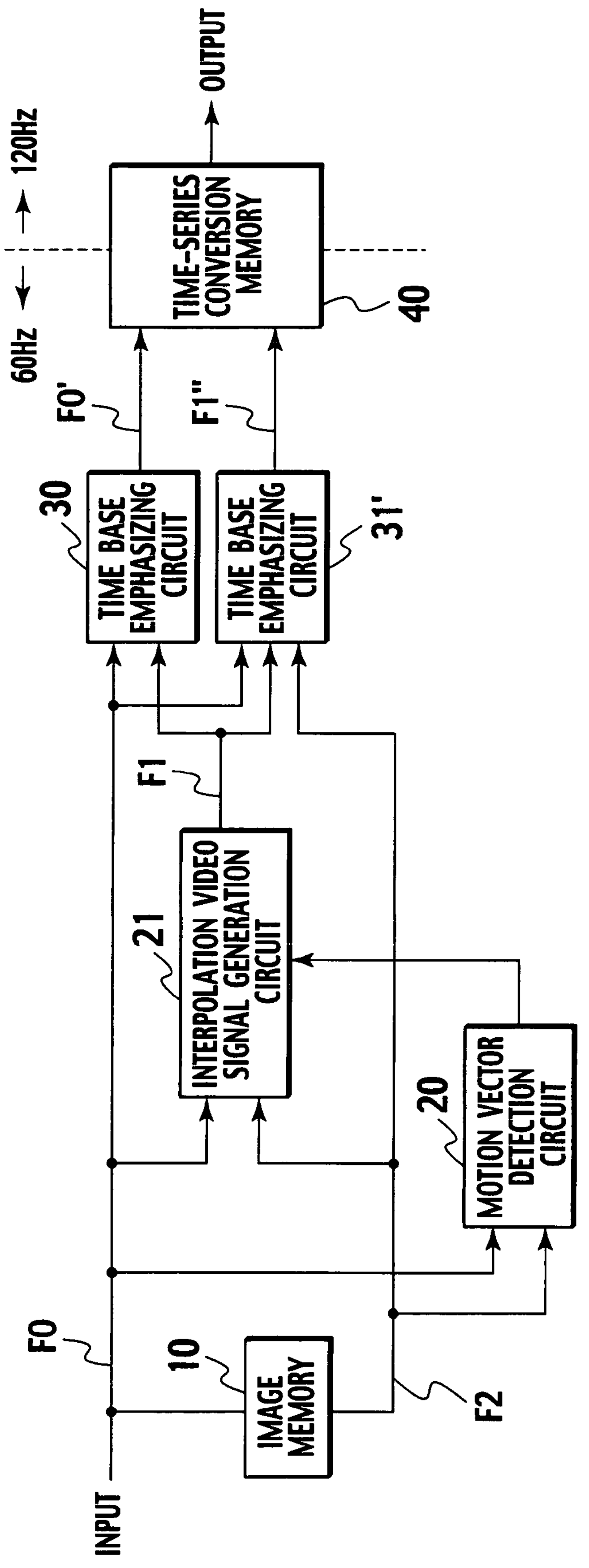
FIG. 8 is a block diagram showing the fourth embodiment.

FIG. 8 shows a fourth embodiment. A difference from the first embodiment lies in that the time base emphasizing circuit 31 shown in FIG. 1 is substituted by a time base emphasizing circuit 31' to which not only the interpolation video signal F1 and the one-frame delayed video signal F2 but also the input video signal F0 are supplied as signals which are input to the time base emphasizing circuit.

The time base emphasizing circuit 31 shown in FIG. 1 applies time base emphasis with respect to a change from the one-frame delayed video signal F2 to the interpolation video signal F1, but the time base emphasizing circuit 31' depicted in FIG. 8 previously performs correction with respect to a subsequent change from the interpolation video signal F1 to the input video signal F0. It is to be noted that an internal structure of the time base emphasizing circuit 31' is the same as the FIG. 10 configuration described in conjunction with the third embodiment, thereby eliminating its explanation.

An effect obtained by the time base emphasizing circuit 31' used in this embodiment is introduced in, e.g., "DCC2: Novel Method for Fast Response Time in PVA Mode" by J. K. Song and et al., 1344, SID 04 DIGEST. This reference reports that physical response excellently functions by previously applying a gray voltage before a liquid crystal changes from black to white.

Figure 4A:
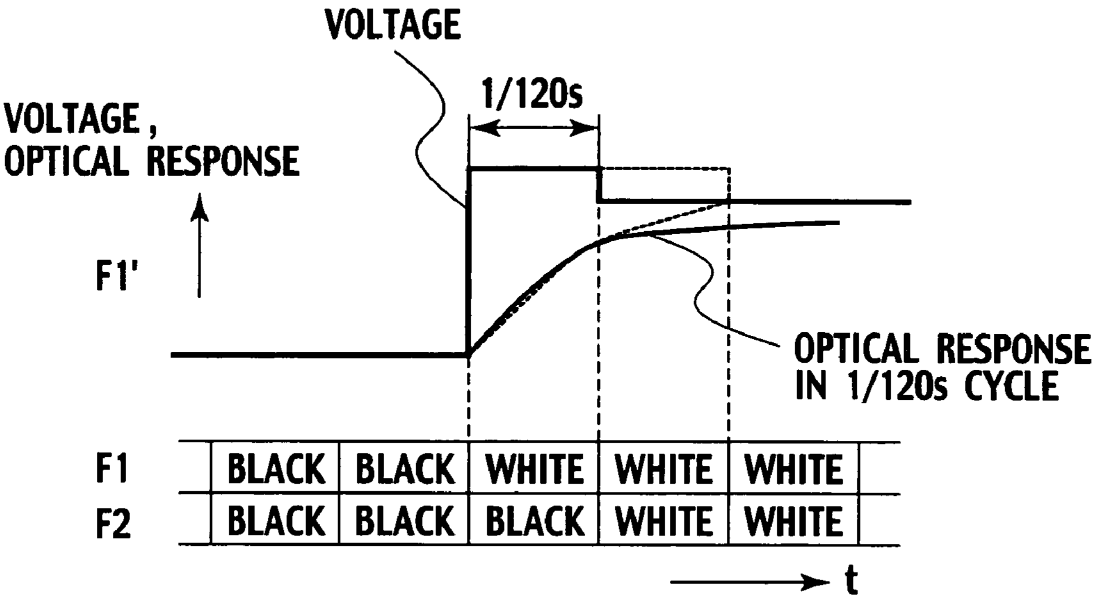
FIGS. 4A and 4B are views illustrating effects of a fourth embodiment.
Figure 4B:
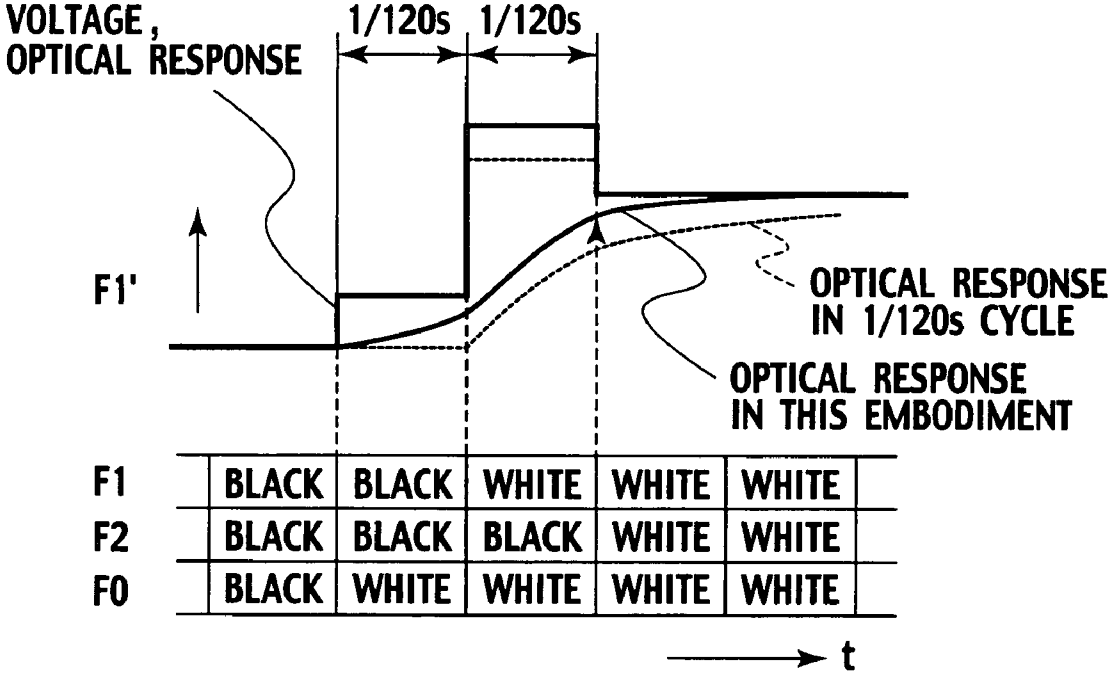

FIGS. 4*a* and 4B are views illustrating effects obtained by this time base emphasizing circuit 31'. In both FIGS. 4A and 4B, a horizontal axis represents a lapsed time, and a vertical axis represents a voltage of an emphasized video signal and how optical response of a liquid crystal screen which emits light with this voltage varies. Further, a lower zone shows how video signals used to generate this emphasized video signal vary (from black to white).

FIG. 4A shows a state in the first embodiment, and FIG. 4B shows a state in this fourth embodiment.

As indicated by dotted lines, it is assumed that expected optical response correction is performed when a frame frequency is 60 Hz. However, when time base emphasis is effected with a frame frequency of 120 Hz like the first embodiment indicated by solid lines, a period in which the emphasized video signal is given is reduced to ½ of that in case of 60 Hz. Therefore, sufficient correction cannot be performed as optical response as indicated by solid lines in some cases.

In this embodiment, as shown in FIG. 4B, the input video signal F0 is also used in addition to the signals depicted in FIG. 4A as a signal utilized to generate an emphasized video signal F1". Adopting this configuration can obtain such an emphasized video signal F1" as shown in FIG. 4B. As described above, increasing a degree of optical response to some measure in advance by emphasis using the input video signal F0 before actual change (from black to white) of an image of the interpolation video signal F1 can provide such a curve as depicted in FIG. 4B, thereby enabling sufficient correction.

The time base emphasizing circuit 31' performs time base emphasis to the interpolation video signal F1, whereas the input video signal F0 corresponds to the next frame (a future frame) in conversion to 120 Hz. Therefore, it is easy to carry out correction of this embodiment with respect to the interpolation video signal F1 by seeing a change from the interpolation video signal F1 to the input video signal F0. However, when a time base emphasis target of the time base emphasizing circuit 30 is the input video signal F0, the entire input video signal F0 and interpolation video signal F1 must be entirely one frame delayed in conversion to 120 Hz to generate a future frame F(−1) in order to apply correction of this embodiment to the input video signal F0.

However, as described in conjunction with the third embodiment, it was revealed from an experiment that a sufficient effect can be obtained by using the time base emphasizing circuit 31' to perform time base emphasis between two frames (F0 and F2) to a large extent in conversion to 120 Hz even if the time base emphasizing circuit 30 does not execute time base emphasis between two frames (F(−1) and F1) in conversion to 120 Hz. That is because an integration time of a human visual perception is approximately 1/60 s, and hence correction with respect to the input video signal F0 and correction with respect to the interpolation video signal F1 are averaged like the third embodiment.

As described above, in the fourth embodiment, when performing time base emphasis with respect to the interpolation video signal F1, time base emphasis can be carried out between preceding and subsequent frames in conversion to 120 Hz. Furthermore, a new frame memory does not have to be added in order to effect this time base emphasis between preceding and subsequent frames.

Therefore, this embodiment has characteristics that an increase in cost can be suppressed while improving a moving image prevention effect as compared with the prior art. Moreover, since the processing is carried out with an operating frequency of 60 Hz, it is possible to avoid a difficulty in realization of a circuit operation due to speeding up of the operating frequency.

Additionally, although not shown, the third embodiment can be combined with the fourth embodiment to perform time base emphasis with respect to the input video signal F0 by using the interpolation video signal F1 which is one frame ahead in conversion to 120 Hz and also the video signal which is two frames ahead in conversion to 120 Hz, and perform time base emphasis with respect to the interpolation video signal F1 by using the video signal F2 which is one frame ahead and the input video signal F0 which is one frame behind in conversion to 120 Hz, thereby executing more excellent time base emphasis correction.

Further, in case of performing threefold or greater conversion of a frame frequency like the second embodiment, it is possible to use signals which are one frame ahead and two frames ahead (the third embodiment) of a correction target frame or signals which are one frame ahead of or one frame behind (the fourth embodiment) a correction target frame in each time base emphasizing circuit without adding a new frame memory.

Figure 15:
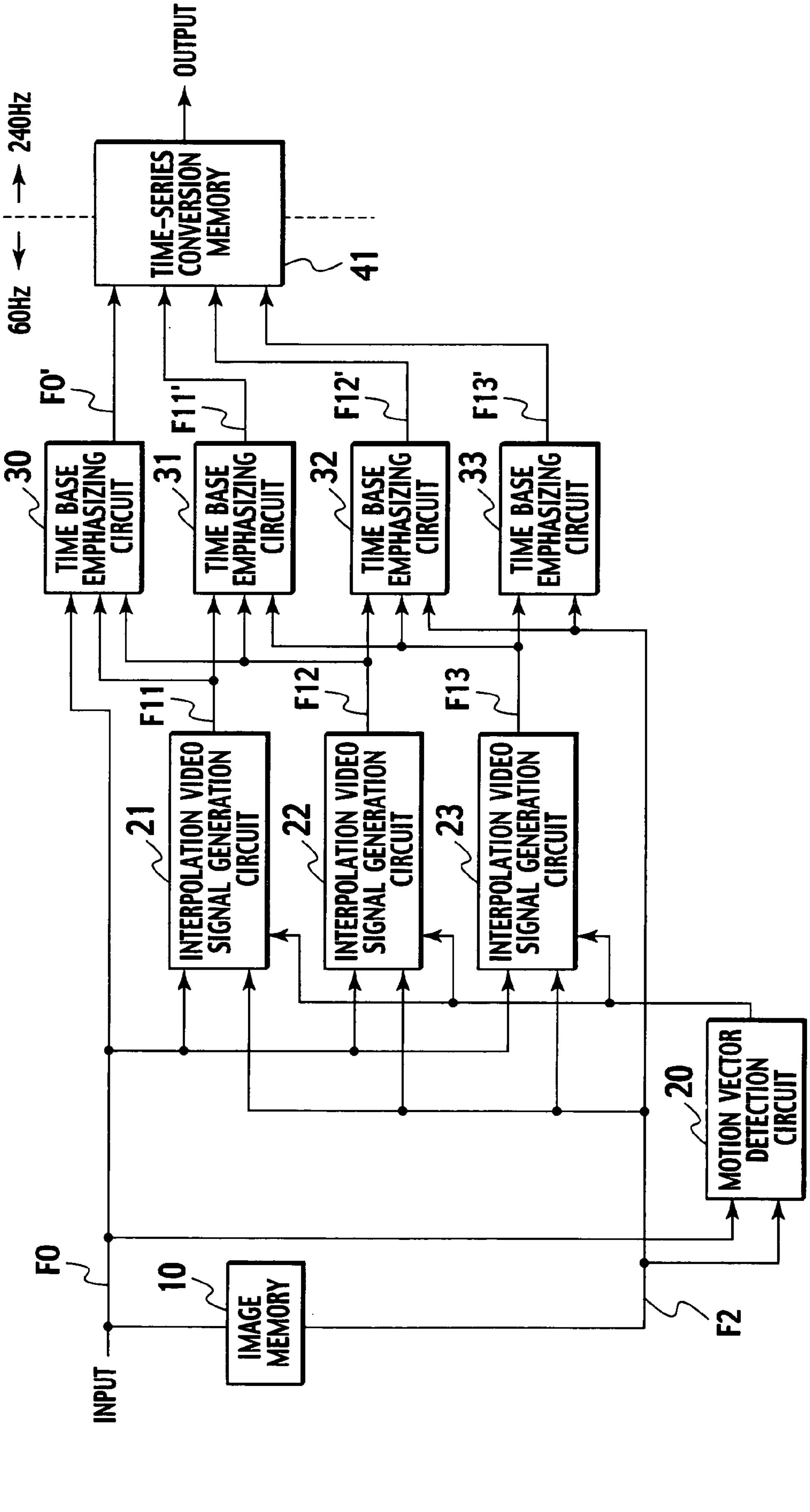
FIG. 15 is a block diagram showing a structural example in which the second embodiment is combined with the third embodiment.
Figure 16:
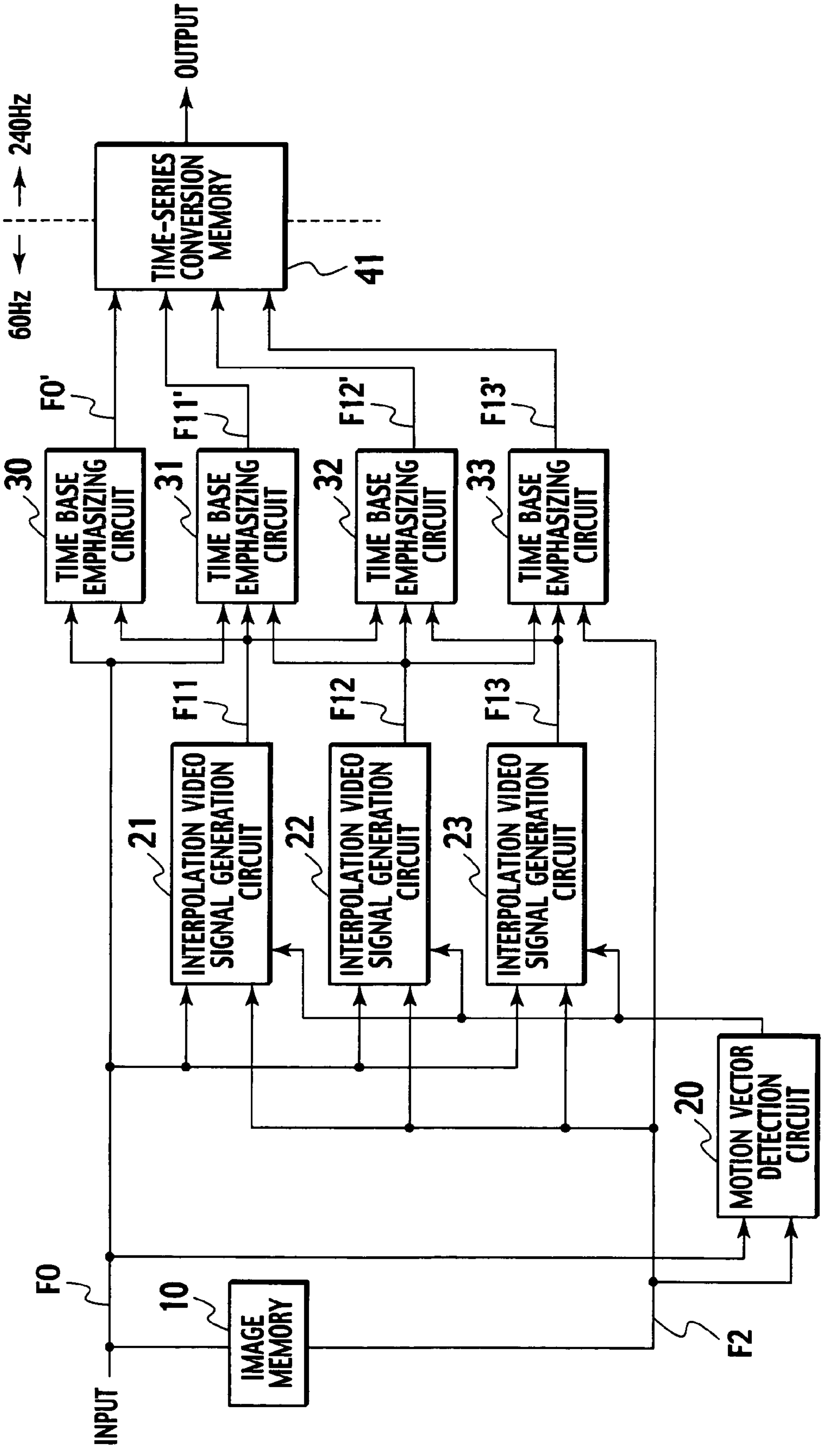
FIG. 16 is a block diagram showing a structural example in which the second embodiment is combined with the fourth embodiment.

FIG. 15 shows a structural example in which the second embodiment is combined with the third embodiment. Furthermore, FIG. 16 shows a structural example in which the second embodiment is combined with the fourth embodiment.

Fifth Embodiment

Figure 9:
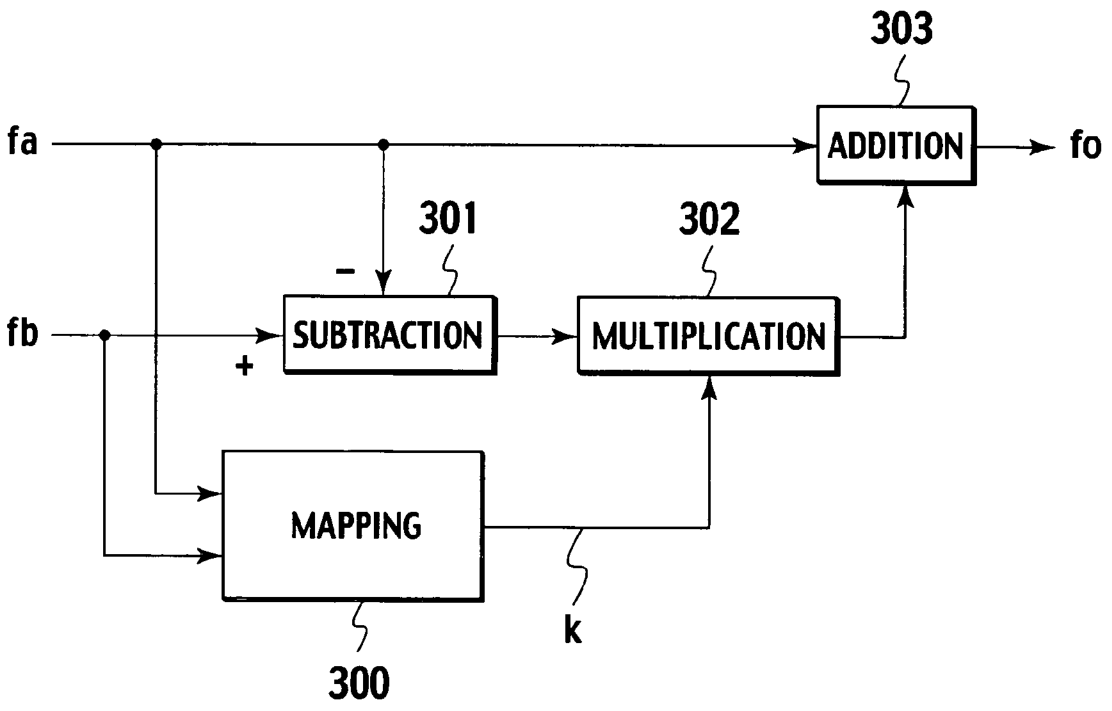
FIG. 9 is a block diagram showing a structural example of a time base emphasizing circuit in a fifth embodiment.

According to a fifth embodiment, a gain k is controlled with respect to structures of the time base emphasizing circuits 30 and 31 shown in FIG. 2 in accordance with voltage levels of video signals fa and fb. It is known that a response speed of a liquid crystal is dependent on a voltage to be applied. When a gain of time base emphasis is mapped onto a previously measured and determined optimum value in accordance with voltage levels of the signal fb before a changeover of an image (a frame) and the signal fa after the changeover, more accurate time base emphasis correction can be executed. A mapping circuit 300 shown in FIG. 9 is a circuit which converts the gain by using a conversion table. Moreover, FIG. 14 shows a specific example of the conversion table used in this mapping circuit 300.

Incidentally, in case of utilizing such signals corresponding to three frames as described in conjunction with the third embodiment or the fourth embodiment, it is preferable to obtain a gain according to changes in voltage levels corresponding to three frames with respect to inputs to this mapping circuit 300.

It should be understood that many modifications and adaptations of the invention will become apparent to those skilled in the art and it is intended to encompass such obvious modifications and changes in the scope of the claims appended hereto.

What is claimed is:

1. An image display unit using an active matrix type display panel which has a plurality of pixels arranged in a matrix form and holds an electrical signal pixel by pixel for a predetermined time for display, the image display unit comprising:

a delaying section which delays a first video signal input in a first frame cycle by one frame to generate a second video signal;

an interpolation video signal generating section which uses the first video signal and the second video signal to generate an interpolation video signal which is inserted into a temporally advanced section of sections obtained by dividing a period of each first frame cycle into two;

a first time base emphasizing section which uses the interpolation video signal and the second video signal to emphasize a high-pass component of the interpolation video signal in a time base direction;

a second time base emphasizing section which uses the interpolation video signal and the first video signal to emphasize a high-pass component of the first video signal in the time base direction;

a write section which writes in a memory the interpolation video signal output from the first time emphasizing section and the first video signal output from the second time emphasizing section in the first frame cycle; and a read section which reads the interpolation video signal and the first video signal written in the memory by the write section in a second frame cycle obtained by multiplying the first frame cycle by ½ in the order of the interpolation video signal and the first video signal.

2. The image display unit according to claim 1, wherein the first time base emphasizing section uses the second video signal and the first video signal to emphasize the high-pass component of the interpolation video signal in the time base direction.

3. The image display unit according to claim 1, wherein the second time base emphasizing section uses the interpolation video signal and the second video signal to emphasize the high-pass component of the first video signal in the time base direction.

4. An image display unit using an active matrix type display panel which has a plurality of pixels arranged in a matrix form and holds an electrical signal pixel by pixel for a predetermined time for display, the image display unit comprising:

a delaying section which delays a first video signal input in a first frame cycle by one frame to generate a second video signal;

first to (n−1)th interpolation video signal generating sections which use the first video signal and the second video signal to generate first to (n−1)th interpolation video signals which are respectively interpolated in temporally advanced first to (n−1)th sections of sections obtained by dividing a period of each first frame cycle into n, where n is a predetermined integer which is not smaller than 3;

a first time base emphasizing section which uses the interpolation video signal and the second video signal to emphasize a high-pass component of the first interpolation video signal in a time base direction;

second to (n−1)th time base emphasizing sections which respectively uses the second to (n−1)th interpolation video signals and the first to (n−2)th interpolation video signals to emphasize high-pass components of the second to (n−1)th interpolation video signals in the time base direction;

an nth time base emphasizing section which uses the interpolation video signal and the (n−1)th interpolation video signal to emphasize a high-pass component of the first video signal in the time base direction;

a write section which writes in a memory in the first frame cycle the first to (n−1)th interpolation video signals having the high-pass components emphasized in the time base direction and the first video signal having the high-pass component emphasized in the time base direction; and a read section which reads the first to (n−1)th interpolation video signals and the first video signal written by the write section in a second frame cycle obtained by multiplying the first frame cycle by 1/n in the order of the first interpolation video signal, the second interpolation video signal, in a series continuing through to the (n−1)th interpolation video signal and the first video signal, wherein an ith time base emphasizing section in the second to (n−1)th time base emphasizing sections uses an (i−1)th interpolation video signal to emphasize an ith interpolation video signal, where i is an integer which is not smaller than 2 and not greater than (n−1).

* * * * *